UNITED STATES PATENT OFFICE.

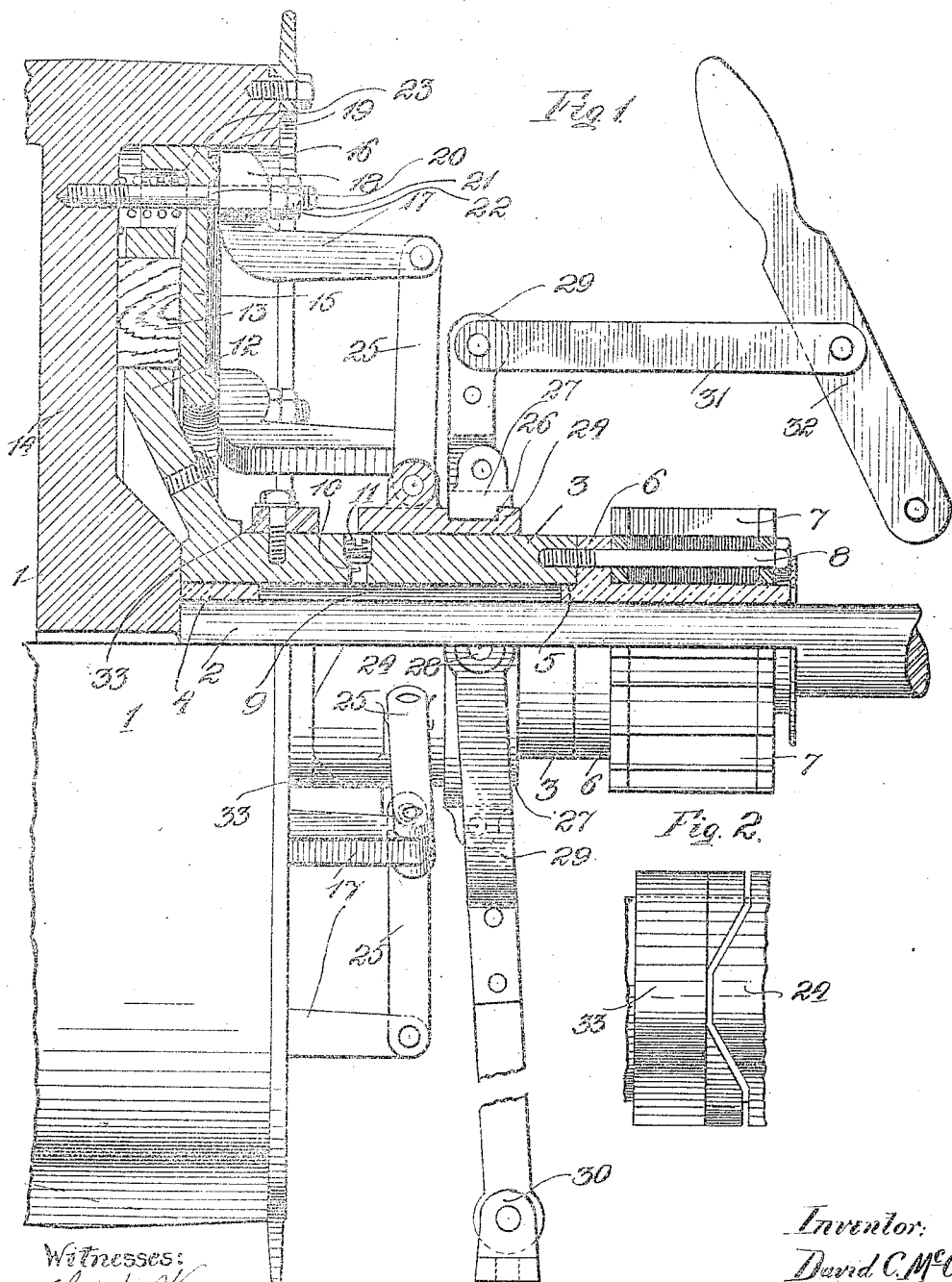

DAVID C. McCAN, OF LOS ANGELES, CALIFORNIA.

AUTOMATIC CLUTCH-RELEASE.

1,075,237.   Specification of Letters Patent.   Patented Oct. 7, 1913.

Application filed May 27, 1912. Serial No. 700,101.

*To all whom it may concern:*

Be it known that I, DAVID C. McCAN, a citizen of the United States, residing at Los Angeles, in the county of Los Angeles and State of California, have invented a certain new and useful Improvement in Automatic Clutch-Releases, of which the following is a specification.

My invention has reference to a clutch for pulleys and the like, and relates especially to an automatic clutch release.

While the invention hereinafter described may find general application in nearly all classes of power machinery, it has specific application in the present instance to machines for compressing wood shavings and other lumber waste into blocks for fuel purposes, and to this end contemplates the provision of a mechanism in which the driving pulley disengages the driven mechanism whenever it is impossible for it to be driven, without breaking the machine.

In the drawing, Figure 1, represents a front elevation, half in section, to illustrate parts otherwise hidden, and Fig. 2, is a fragmentary detail of the clutch hub and clutch strap.

Specific reference being had to the drawing, 1, designates a pulley, keyed on a shaft 2, mounted in suitable bearings, not shown. 3, is a sleeve loosely mounted on said shaft 2, and held spaced therefrom by a ring 4, and a rabbet 5, of a collar 6, on which is fastened a pinion 7, arranged to transmit power to a gear wheel, not shown, of a wood shaving block compressing machine. Said pinion 7, is fastened on said collar 6, by cap screws 8, which also serve to fasten said collar 6, on said sleeve 3. The space 9, between said shaft 2, and sleeve 3, forms a chamber for oil, which is supplied thereto through a hole 10, closed by a plug 11. Contiguous with said sleeve 3, and at approximately right angles thereto, is an annular disk 12, provided with a plurality of blocks 13, which are of a slightly greater thickness than said disk, and are arranged to be forced in frictional engagement with the web 14, of said pulley 1, by a friction ring 15. The friction ring 15, fits within the pulley flange 16, and is actuated to force said blocks 13, in contact with the web 14, of said pulley, by a plurality of arms 17, provided with heads 18 which impinge against an annular bead 19, on said friction ring 15. The several heads 18, of said arms 17, are supported in their relative positions, as shown, by shanks 20, of bolts 21, which are screwed into the web 14, of said pulley, nuts 22, on said bolts, serving to hold said heads 18, thereon. Said friction ring 15, is held normally in contact with said heads 18, and out of engagement with said blocks 13, by helical springs 23, coiled around said bolts 21. Pivotally connecting the ends of said arms 17, with a cam clutch hub 24, loosely mounted on said sleeve 3, are links 25. In a groove 26, of said clutch hub 24, is a strap 27, provided with studs 28, on which is mounted a shifter 29, pivotally secured to a suitable support 30. To the upper part of said shifter 29, is pivotally fastened a link 31, connected with a lever 32, for actuating the shifter 29. Bolted onto said sleeve 3, is a cam ring 33, with which said cam clutch hub 24, is arranged to coöperate, as will appear more fully hereinafter.

In the position of the parts shown, the friction ring 15, has been forced against the friction blocks 13, which in turn are forced in contact with the web 14, of the pulley 1, and the cam clutch hub 24, has been moved in engagement with the cam ring 33. All parts are now connected with the pulley 1, and rotate therewith. Should too much material be fed into the compression chamber of the compressor, or hard foreign pieces be delivered thereinto with the shavings, and for this reason, the compressing piston cannot move, beyond a certain straining point, the driven gear of the compressor, not shown, which is arranged in mesh with the pinion 7, will stop, together with all the parts connected therewith. The pulley 1, however, will continue to revolve, and in so doing, cause the cam clutch hub 24, to be disengaged from the cam ring 33.

What I claim, is:—

1. The combination with a shaft and a pulley mounted thereon, of a sleeve loosely mounted on said shaft and provided with friction means, a pinion on said sleeve, a cam hub slidable on said sleeve, means connected to and controllable by the movement of said cam hub to cause said friction means to engage said pulley, and means to automatically move said cam hub on said sleeve to cause said friction means to disengage from said pulley when the speed of the pinion is less than that of the pulley.

2. The combination with a shaft and a pulley mounted thereon, of a sleeve loosely mounted on said shaft and provided with friction means, a cam hub loose on said sleeve and connected with said pulley, means controllable by said cam hub to cause said friction means to be bound with said pulley, a cam ring rigid on said sleeve, and means to simultaneously move said cam hub in engagement with said cam ring and said frictional means in engagement with said pulley.

3. The combination with a shaft and a pulley mounted thereon, of a sleeve loose on said shaft and provided with friction means, a driven element on said sleeve, a cam ring rigid on said sleeve, a cam hub loose on said sleeve and arranged for engagement with said cam ring, said cam hub being provided with means to actuate said friction means for locking said cam hub and said sleeve with said pulley, and means to move said cam hub on said sleeve.

4. The combination with a shaft and a pulley mounted thereon, of a sleeve loosely mounted on said shaft, a plurality of blocks on said sleeve, a pinion on said sleeve, a ring to move said blocks in engagement with said pulley to frictionally lock said sleeve on said pulley, a clutch hub slidable on said sleeve and provided with means to operate said ring, a lever to operate said clutch hub, and means mounted on said sleeve to cause the friction of said blocks to be relieved from said pulley when the revolution of said gear is stopped.

5. The combination with a shaft and a pulley mounted thereon, of a sleeve loosely mounted on said shaft and provided with a plurality of blocks, a cam ring mounted on and rotatable with said sleeve, a pinion on said sleeve, a ring to frictionally bind said blocks on said pulley, a clutch hub to coöperate with said cam ring loosely mounted on said sleeve and provided with means to actuate said friction ring, and a lever to move said clutch hub in engagement with said cam ring and to control said friction ring actuating means.

In testimony whereof I affix my signature in the presence of two witnesses.

DAVID C. McCAN.

Witnesses:
H. STANLEY BENEDICT,
ANTON GLOETZNER, Jr.